United States Patent
Huggins et al.

(10) Patent No.: US 6,198,744 B1
(45) Date of Patent: Mar. 6, 2001

(54) ASYNCHRONOUS TRANSFER MODE (ATM) BASED VERY-HIGH-BIT-RATE DIGITAL (VDSL) SUBSCRIBER LINE COMMUNICATION SYSTEM AND METHOD

(75) Inventors: Joseph P. Huggins, Littleton; James W. Nevelle; Bruce A. Phillips, both of Highlands Ranch; Kurt Campbell, Denver; Clinton L. Cave, Highland Ranch, all of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/283,491

(22) Filed: Apr. 1, 1999

(51) Int. Cl.[7] .................................................. H04L 12/56
(52) U.S. Cl. ........................................ 370/395; 370/538
(58) Field of Search ..................................... 370/403, 404, 370/405, 406, 541, 535, 906, 907, 395, 397, 254, 477, 438, 537

(56) References Cited

U.S. PATENT DOCUMENTS

| | | | |
|---|---|---|---|
| 5,495,484 | * | 2/1996 | Self et al. . |
| 5,548,431 | | 8/1996 | Shin et al. . |
| 5,764,392 | | 6/1998 | Van As et al. . |
| 5,867,484 | * | 2/1999 | Shaunfield ............................ 370/254 |
| 5,867,502 | * | 2/1999 | Chang ................................... 370/477 |
| 5,969,836 | * | 10/1999 | Foltzer .................................. 359/114 |
| 5,991,271 | * | 11/1999 | Jones et al. ........................... 370/252 |
| 6,041,056 | * | 3/2000 | Brigham et al. ...................... 370/395 |

* cited by examiner

Primary Examiner—Douglas W. Olms
Assistant Examiner—Ken Vanderpuye
(74) Attorney, Agent, or Firm—Brooks & Kushman P.C.

(57) ABSTRACT

An asynchronous transfer mode (ATM) based very-high-bit-rate subscriber line (VDSL) communication system includes an optical ring having a plurality of multiplexers. An information provider is connected to the optical ring via a first one of the multiplexers. The information provider includes an ATM core switch operable with the first one of the multiplexers for transmitting data and video signals on to the optical ring and for receiving data signals from the optical ring. Each of a plurality of central offices is connected to the optical ring via a respective one of the multiplexers. Each of the central offices includes an ATM edge switch operable with the respective one of the multiplexers for receiving video and data signals from the information provider via the optical ring and for transmitting data signals to the information provider via the optical ring. The information provider communicates with the central offices through a single optical ring. The central offices are configured to transform single video and data signals from the information provider into multiple signals for use by host digital terminals. The central offices are also configured to statistically multiplex multiple data signals from the host digital terminals into a single data signal for transmission to the information provider via the optical ring. The central offices are further configured to integrate a local public, educational, and government video signal with a video signal received from the information provider for use by the host digital terminals.

17 Claims, 3 Drawing Sheets

ASYNCHRONOUS TRANSFER MODE (ATM) BASED VERY-HIGH-BIT-RATE DIGITAL (VDSL) SUBSCRIBER LINE COMMUNICATION SYSTEM AND METHOD

TECHNICAL FIELD

The present invention relates to asynchronous transfer mode (ATM) based very-high-bit-rate digital subscriber line (VDSL) communication systems and methods for providing video and data services.

BACKGROUND ART

In a very-high-bit-rate digital subscriber line (VDSL) communication system, an existing information provider, which may be a video information provider, a data information provider, or a video and data information provider, typically connects to a central office with a direct connection: Typically, a bidirectional connection is needed for the data traffic between the information provider and the central office and two unidirectional connections are needed for the video traffic from the information provider to the central office. For the information provider to provide services to multiple central offices, additional direct connections to the additional central offices must be provided.

Because each information provider, with existing techniques, must arrange to have their own physical connections to each central office that service is provided to, it becomes difficult and expensive for an information provider to serve a lot of different central offices over a wide area.

For the foregoing reasons, there is a need for a VDSL communication system and associated method that overcomes the limitations of the prior art.

DISCLOSURE OF INVENTION

Accordingly, it is an object of the present invention to provide an asynchronous transfer mode (ATM) based very-high-bit-rate digital subscriber line (VDSL) communication system and associated method that uses an optical ring as a point of entry for an information provider.

In carrying out the above object and other objects, the present invention provides an asynchronous transfer mode (ATM) based very-high-bit-rate subscriber line (VDSL) communication system. The communication system includes an optical ring having a plurality of multiplexers. An information provider is connected to the optical ring via a first one of the multiplexers. The information provider includes an ATM core switch operable with the first one of the multiplexers for transmitting data and video signals on to the optical ring and for receiving data signals from the optical ring. A central office is connected to the optical ring via a second one of the multiplexers. The central office includes an ATM edge switch operable with the second one of the multiplexers for receiving data and video signals from the information provider via the optical ring and for transmitting data signals to the information provider via the optical ring.

Preferably, the central office further includes a plurality of host digital terminals connected to the ATM edge switch for receiving video and data signals from the information provider and for transmitting data signals to the information provider. The ATM edge switch demultiplexes a data signal received from the optical ring via the second one of the multiplexers into multiple data signals and then provides a respective data signal to each one of the plurality of host digital terminals. Each one of the plurality of host digital terminals provides a data signal to the ATM edge switch. The ATM edge switch statistically multiplexes the data signals from the plurality of host digital terminals into a single data signal and then provides the single data signal to the second one of the multiplexers for transmission of the single data signal through the optical ring to the information provider.

Preferably, the central office further includes an optical splitter operable with the second one of the multiplexers for connecting the central office to the optical ring. The optical splitter splits a video signal received from the optical ring into multiple video signals and then provides a respective video signal to each one of the plurality of host digital terminals.

Preferably, the central office further includes a public, education, and government (PEG) video channel generator for generating a PEG video signal. The ATM edge switch receives a video signal from the optical ring and then integrates the PEG video signal into the received video signal. The ATM edge switch provides the integrated video signal to the optical splitter which splits the video signal received from the ATM edge switch into multiple video signals and then provides a respective video signal to each one of the plurality of host digital terminals.

Further, in carrying out the above object and other objects, the present invention provides another ATM based VDSL communication system. This communication system includes an optical ring having a plurality of multiplexers. An information provider is connected to the optical ring via a first one of the multiplexers. The information provider includes an ATM core switch operable with the first one of the multiplexers, for transmitting data and video signals on to the optical ring and for receiving data signals from the optical ring. Each of a plurality of central offices is connected to the optical ring via a respective one of the multiplexers. Each of the plurality of central offices includes an ATM edge switch operable with the respective one of the multiplexers for receiving video and data signals from the information provider via the optical ring and for transmitting data signals to the information provider via the optical ring.

Still further, in carrying out the above object and other objects, the present invention provides a method for using an ATM based VDSL communication system. The method includes connecting a plurality of multiplexers to an optical ring. An information provider is then connected to the optical ring via a first one of the multiplexers to transmit data and video signals on to the optical ring via an ATM core switch and to receive data signals from the optical ring via the ATM core switch. An ATM edge switch of each of a plurality of central offices is then connected to the optical ring via a respective one of the plurality of multiplexers to receive video and data signals from the information provider via the optical ring and to transmit data signals to the information provider via the optical ring.

The advantages of the present invention are numerous. For instance, embodiments of the present invention allow an information provider to communicate with a plurality of central offices through a single optical ring. The central offices are configured to transform video and data signals from the information provider into multiple signals for use by host digital terminals. The central offices are also configured to statistically multiplex, i.e., concentrate, multiple data signals from the host digital terminals into a single data signal for transmission to the information provider via the optical ring. The central offices are further configured to integrate a local public, educational, and government video signal into a video signal received from the information provider for use by the host digital terminals.

Further, embodiments of the present invention allow multicasting from an information provider to the central offices. Utilization of multicasting allows for the transmission of a single source, such as a video source, to multiple destinations via the optical ring. Embodiments of the present invention may be configured to provide switched virtual connections. Switched virtual connections allow a customer connected to a host digital terminal to select video information in real time, and may even be configured with features such as pause, rewind, and fast forward.

Still further, embodiments of the present invention may be configured to allow the ATM edge switches at the central offices to statistically multiplex data signals received from the host digital terminals for transmission to the optical ring. Similarly, the ATM core switch at the information provider may be configured to statistically demultiplex data signals for transmission to the optical ring. Embodiments of the present invention are advantageous in that the optical ring may be used to define a point of entry into an ATM network for information providers.

The above object and other objects, features, and advantages of the present invention will be apparent from the following detailed description of the best mode for carrying out the invention when taken in connection with the accompanying drawings.

BEST MODE FOR CARRYING OUT THE INVENTION

Figure 1:
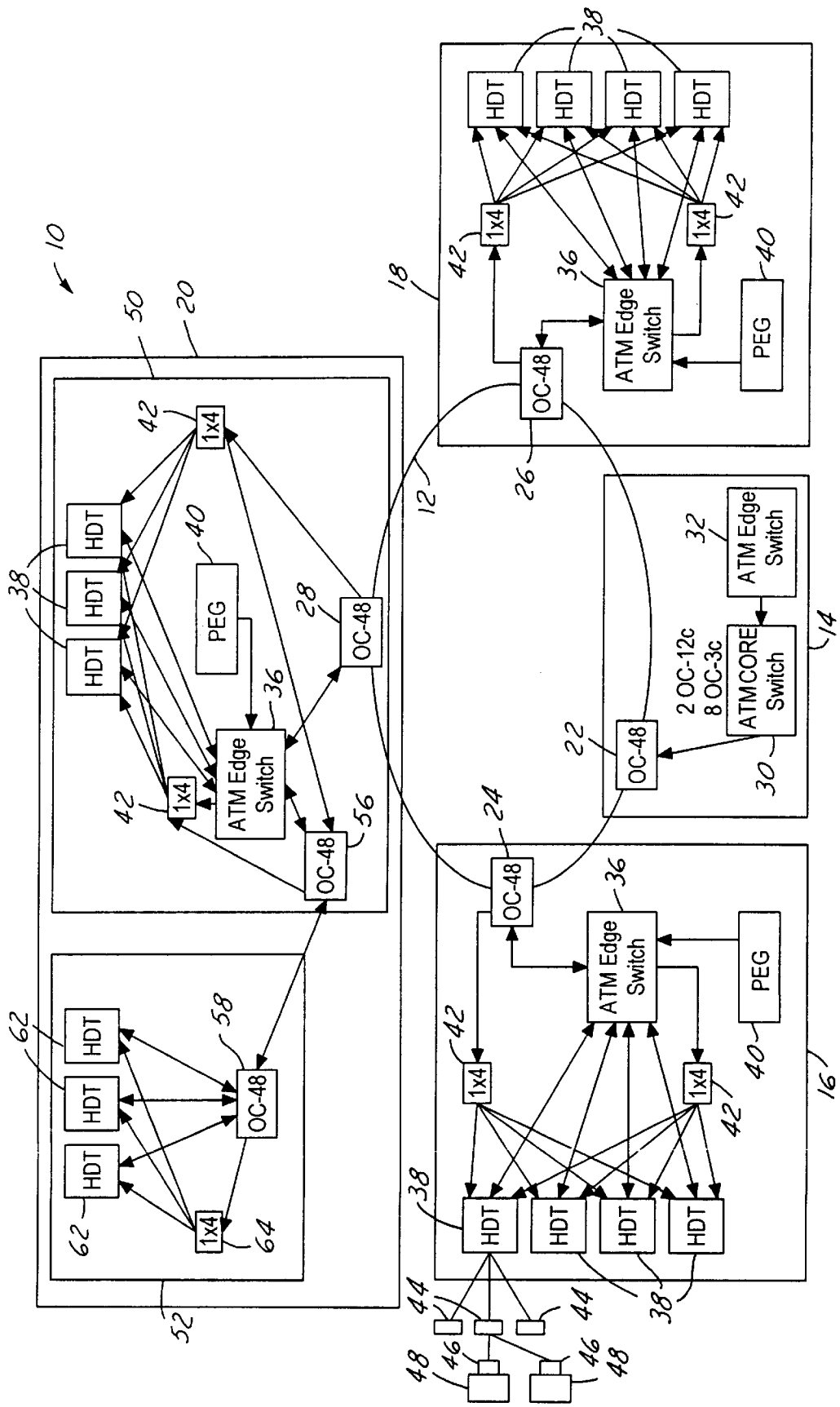
FIG. 1 illustrates an ATM based VDSL communication system in accordance with the present invention.

Referring now to FIG. 1, an asynchronous transfer mode (ATM) based very-high-bit-rate digital subscriber line (VDSL) communication system 10 in accordance with the present invention is shown. ATM is a high bandwidth, low-delay, connection-oriented, packet-like switching and multiplexing technique. ATM transmissions are cell-based, with cells having a fixed length. Information is presented to the network asynchronously. However, the switches and interlinking transmission facilities are synchronized. Of course, it is to be appreciated that the term "asynchronous transfer mode" as used herein is meant to encompass equivalent network architectures in addition to traditional ATM.

VDSL services are of particular interest for a hybrid local loop scenario. In particular, communication system 10 is suitable for fiber-to-the-neighborhood (FTIN) and fiber-to-the-curb (FTTC) distribution. Communication system 10 is composed primarily of fiber and provides distribution from an information provider to various central offices. Fiber may then extend from the central office to host digital terminals (HDT) and then to network units. VDSL over unshielded twisted pair carries the signal the last leg to the individual residential premises.

Communication system 10 includes an optical ring 12, a video and data information provider 14, and a plurality of central offices 16, 18, and 20. Multiplexers 22, 24, 26, and 28 connect information provider 14 and central offices 16, 18, and 20, respectively, to optical ring 12. Advantageously, information provider 14 and central offices 16, 18, and 20 communicate through optical ring 12. Information provider 14 transmits video and data signals to central offices 16, 18, and 20 via optical ring 12. Central offices 16, 18, and 20 transmit data signals to information provider 14 via optical ring 12.

Figure 2:
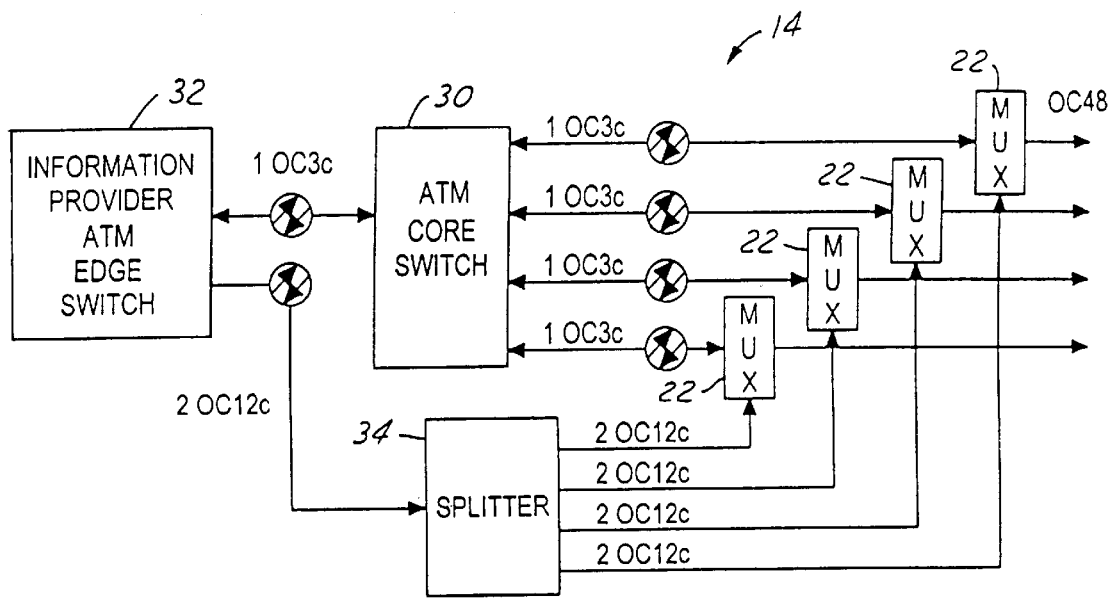
FIG. 2 illustrates the information service provider of the ATM based VDSL communication system shown in FIG. 1.

Referring now to FIGS. 1 and 2, information provider 14 includes an ATM core switch 30 and an information provider ATM edge switch 32. ATM core switch 30 is operable with multiplexer 22 for transmitting data and video signals on to optical ring 12 and for receiving data signals from the optical ring. Information provider ATM edge switch 32 is operable with multiplexer 22 for connecting information provider 14 to optical ring 12. Information provider ATM edge switch 32 generates two video signals and one data signal. The first video signal corresponds to a first set of video channels, for instance, video channels one through seventy. The second video signal corresponds to a second set of video channels, for instance, video channels seventy-one through one hundred and forty. The data signal corresponds to signaling such as signaling indicative of video channel changing, access to the Internet, video tape recorder functions, and the like. Information provider ATM edge switch 32 provides the data signal to ATM core switch 30 along an optical fiber. ATM core switch 30 statistically demultiplexes the data signal from information provider ATM edge switch 32 into multiple data signals and then provides the multiple data signals to multiplexer 22 along an optical fiber for transmission of the multiple data signals through optical ring 12.

Information provider 14 also includes an optical splitter 34. Optical splitter 34 connects multiplexer 22 with information provider ATM edge switch 32 along an optical fiber. Optical splitter 34 receives both of the video signals from information provider ATM edge switch 32. Optical splitter 34 splits the two video signals into multiple sets of video signals for transmission through optical ring 12 with corresponding data signals via multiplexer 22.

Preferably, information provider 14 provides two unidirectional optical carrier OC-12c concatenated video signals and eight bidirectional optical carrier OC-3c concatenated data signals to multiplexer 22. OC-3c provides a bandwidth of about 155.52 Mbps and OC-12c provides a bandwidth of about 622.08 Mbps. The OC-3c connections are configured for two way communication between information provider 14 and central offices 16, 18, and 20. The OC-12c connections are configured for one way communication from information provider 14 to central offices 16, 18, and 20. To transmit and receive the two OC-12c video signals and eight OC-3c data signals throughout optical ring 12, each of multiplexers 22, 24, 26, and 28 are optical carrier OC-48 connections. OC-48 provides a bandwidth of about 2.488 Gbps.

Figure 3:
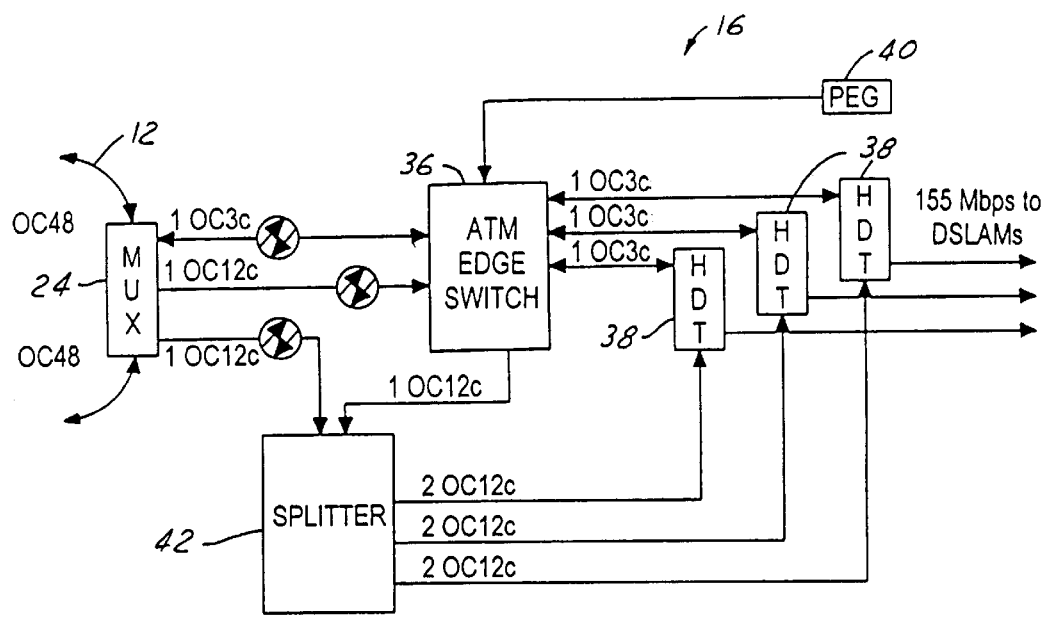
FIG. 3 illustrates a single wire central office of the ATM based VDSL communication system shown in FIG. 1.

Referring now to FIGS. 1 and 3, central offices 16 and 18 will now be described. Central offices 16 and 18 include identical elements and, accordingly, only central office 16 will be described. Central office 16 has a single wire franchise center architecture. Central office 16 includes an ATM edge switch 36, a plurality of host digital terminals (HDTs) 38, a public, educational, government (PEG) video channel generator 40, and an optical splitter 42. ATM edge switch 36 is connected with optical fiber to multiplexer 24 for receiving video and data signals from information provider 14 via optical ring 12 and for transmitting data signals to the information provider via the optical ring. HDTs 38 are connected with optical fiber to ATM edge switch 36 for receiving video and data signals from information provider 14 and for transmitting data signals to the information provider. Specifically, ATM edge switch 36 provides the video and data signals from information provider 14 to HDTs 38 and the ATM edge switch receives the data signals from the HDTs for transmission to the information provider.

HDTs 38 extend the reach of central office. As shown in FIG. 1, a HDT 38 extends to a number of network units 44. Network units 44 are preferably digital subscriber line access multiplexers (DSLAMs) or optical network units (ONU). Preferably, optical fiber is used from HDT 38 to network units 44 (that is, fiber to the neighborhood). At network unit 44, video and data signals are further routed to a network interface 46 at a customer site 48. As the connection between network unit 44 and network interface 46 is at the furthest reach of communication system 10, this connection is preferably twisted pair such as existing copper unshielded twisted pair. That is, VDSL runs from information provider 14 through optical ring 12 to the neighborhood at network unit 44 over optical fiber. Then, the video and data signals are routed from network unit 44 to network interface 46 and customer site 48 over twisted pair.

ATM edge switch 36 statistically demultiplexes a data signal received from optical ring 12 via multiplexer 24 into multiple data signals and then provides a respective data signal to each one of HDTs 38 for transmission to customer sites 48 from information provider 14. Similarly, HDTs 38 transmit data signals from customer sites 48 to ATM edge switch 36 for transmission back to information provider 14. ATM edge switch 36 is configured to concentrate the data signals from HDTs 38 into a single data signal by using statistical multiplexing. ATM edge switch 36 then provides the single data signal to multiplexer 24 for transmission of the single data signal through optical ring 12 to information provider 14. Preferably, ATM edge switch 36 concentrates eight data signals from HDTs 38 into one single data signal for transmission to information provider 14.

ATM edge switch 36 may receive data input from any number of HDTs 38 via interface ports. As such, some interface ports may be filled to capacity while others are not. Regardless of ATM class of service, ATM edge switch 36 may advantageously aggregate the incoming data from HDTs 38 onto a common outgoing port so that the outgoing port is filled to a greater percent capacity. ATM edge switch 36 receives data signals at unspecified bit rates and provides statistical multiplexing gains on those data signals.

PEG generator 40 is connected with optical fiber to ATM edge switch 36. PEG generator 40 generates a PEG video signal and provides the PEG video signal to ATM edge switch 36. ATM edge switch 36 combines the PEG video signal with one of the two video signals received from multiplexer 24 to form an integrated video signal. For instance, the integrated video signal includes video channels one through seventy and the PEG video channels.

Optical splitter 42 is connected with optical fiber to multiplexer 24 for receiving the other video signal corresponding to video channels seventy-one through one hundred forty. Optical splitter 42 splits the other video signal received from optical ring 12 into multiple video signals and then provides a respective video signal to each one of HDTs 38. ATM edge switch 36 provides the integrated video signal to optical splitter 42. Optical splitter 42 splits the integrated video signal received from ATM edge switch 36 into multiple video signals and then provides a respective integrated video signal to each one of HDTs 38. The advantage of having optical splitter 42 is that only one OC-12c video signal is needed to communicate with a plurality of HDTs in a central office. Transporting multiple OC-12c video signals to the central office is expensive. Preferably, optical splitter 42 is a 1:16 splitter.

Communication system 10 has the ability to deliver switched digital video services using ATM switched virtual connections. As such, connections over communication system 10 for video services are made on a demand-basis, and a customer may be able to select a given video content in real-time. Further, it may be suitable to implement other real-time features such as pause, rewind, fast forward, and the like.

Figure 4:
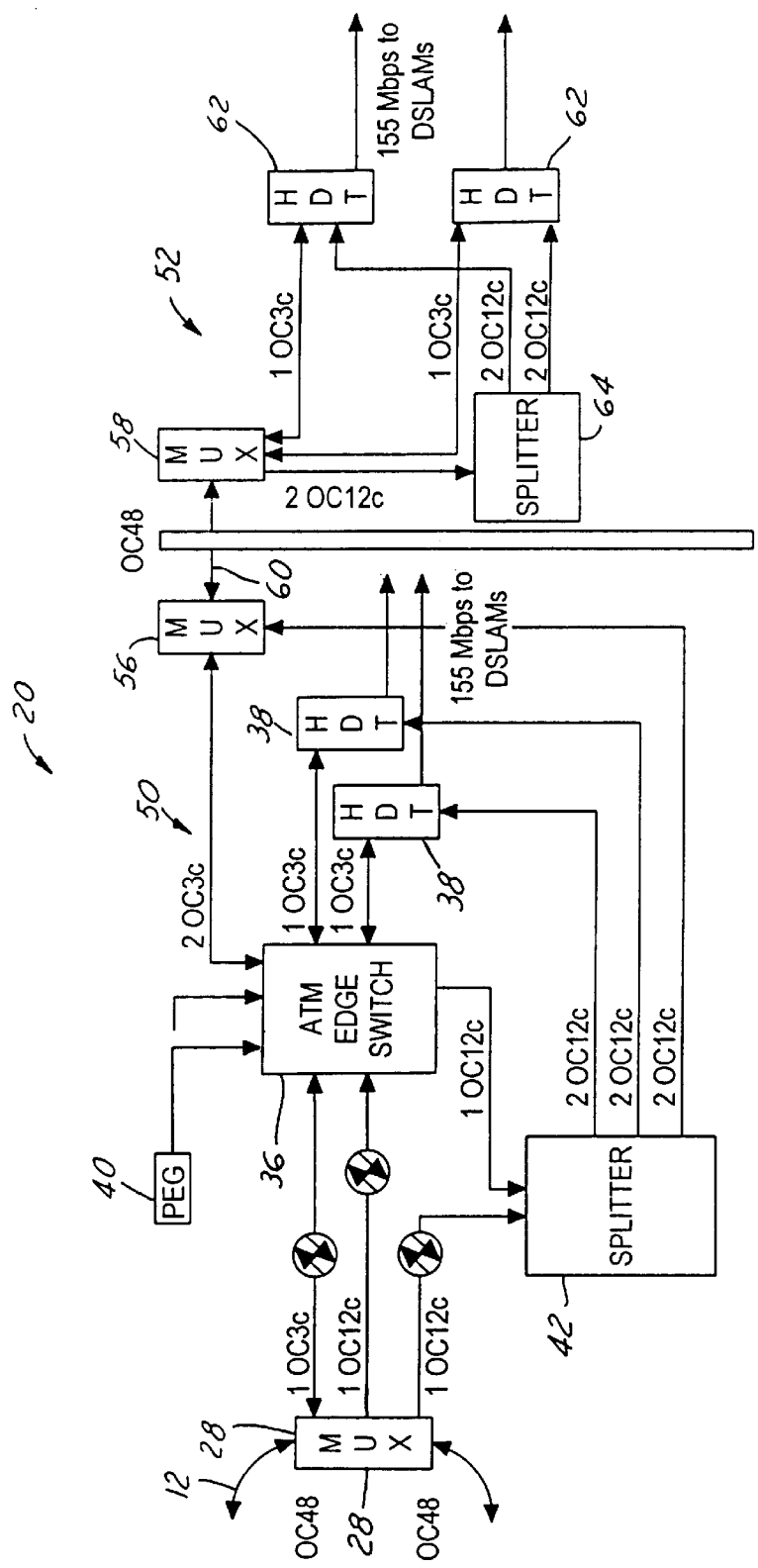
FIG. 4 illustrates a multiple wire central office of the ATM based VDSL communication system shown in FIG. 1.

Referring now to FIGS. 1 and 4, with continual reference to FIG. 3, central office 20 will now be described. Central office 20 has a multiple wire architecture and includes a local area 50 and a remote area 52. Local area 50 has an architecture similar to central offices 16 and 18 and includes identical components such as ATM edge switch 36, HDTs 38, PEG generator 40, and optical splitter 42. Local area 50 receives video and data signals from information provider 14 via optical ring 12 and transmits data signals to the information provider via the optical ring. In addition, local area 50 includes a multiplexer 56 connected to a multiplexer 58 of remote area 52 via an internal optical ring 60. Multiplexers 56 and 58 communicate data and video signals between local area 50 and remote area 52. Internal optical ring 60 is an OC-48 connection.

Remote area 52 further includes a plurality of HDTs 60 and an optical splitter 62. HDTs 60 are connected with optical fiber to multiplexer 58 for receiving from and transmitting data signals to information provider 14 via local area 50. ATM edge switch 36 in local area 50 statistically demultiplexes a data signal received from optical ring 12 via multiplexer 24 into multiple data signals. ATM edge switch 36 then provides the multiple data signals to multiplexers 56 and 58. HDTs 60 then receive a respective data signal from multiplexer 58. Similarly, HDTs 62 transmit data signals back to ATM edge switch 36 via multiplexers 56 and 58. ATM edge switch 36 is configured to concentrate the data signals from HDTs 60 (and HDTs 38) into a single data signal. ATM edge switch 36 then provides the single data signal to multiplexer 28 for transmission of the single data signal through optical ring 12 to information provider 14.

Optical splitter 64 is connected with optical fiber to multiplexer 58 for receiving an integrated video signal from ATM edge switch 36 and the other video signal from optical splitter 42. Optical splitter 64 splits the set of two video signals into multiple sets of video signals and then provides a respective set of video signals to each one of HDTs 62.

Thus, it is apparent that there has been provided, in accordance with the present invention, an ATM based VDSL communication system that fully satisfies the object, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An asynchronous transfer mode (ATM) based very-high-bit-rate subscriber line (VDSL) communication system, the ATM based VDSL communication system comprising:

an optical ring having a plurality of multiplexers;

an information provider connected to the optical ring via a first one of the multiplexers, the information provider including an ATM core switch operable with the first one of the multiplexers for transmitting data and video signals on to the optical ring and for receiving data signals from the optical ring; and a central office connected to the optical ring via a second one of the multiplexers, the central office includes an ATM edge switch operable with the second one of the multiplexers for receiving video and data signals from the information provider via the optical ring and for transmitting data signals to the information provider via the optical ring, wherein the central office includes a plurality of host digital terminals connected to the ATM edge switch for receiving video and data signals from the information provider and for transmitting data signals to the information provider, wherein at least one of the host digital terminals is connected to a plurality of end users, wherein each one of the plurality of host digital terminals provides a data signal to the ATM edge switch, wherein the ATM edge switch statistically multiplexes the data signals from the plurality of host digital terminals into a single data signal and then provides the single data signal to the second one of the multiplexers for transmission of the single data signal through the optical ring to the information provider.

2. The communication system of claim 1 wherein:

a network unit is connected between the at least one of the host digital terminals and the plurality of end users.

3. The communication system of claim 2 wherein:

a twisted pair connects the network unit to the plurality of end users.

4. An asynchronous transfer mode (ATM) based very-high-bit-rate subscriber line (VDSL) communication system, the ATM based VDSL communication system comprising:

an optical ring having a plurality of multiplexers;

an information provider connected to the optical ring via a first one of the multiplexers, the information provider including an ATM core switch operable with the first one of the multiplexers for transmitting data and video signals on to the optical ring and for receiving data signals from the optical ring, wherein the information provider further includes an information provider ATM edge switch operable with the first one of the multiplexers for connecting the information provider to the optical ring, the information provider ATM edge switch generating two video signals and one data signal, the information provider ATM edge switch providing the data signal to the ATM core switch and the video signals to the first one of the multiplexers for transmission of the video signals through the optical ring; and a central office connected to the optical ring via a second one of the multiplexers, the central office includes an ATM edge switch operable with the second one of the multiplexers for receiving video and data signals from the information provider via the optical ring and for transmitting data signals to the information provider via the optical ring, wherein the central office includes a plurality of host digital terminals connected to the ATM edge switch for receiving video and data signals from the information provider and for transmitting data signals to the information provider, wherein at least one of the host digital terminals is connected to a plurality of end users.

5. The communication system of claim 4 wherein:

the ATM core switch demultiplexes the data signal from the information provider ATM edge switch into multiple data signals and then provides the multiple data signals to the first one of the multiplexers for transmission of the multiple data signals through the optical ring.

6. The communication system of claim 1 wherein:

the optical ring includes an OC-48 optical carrier interconnecting the plurality of multiplexers.

7. The communication system of claim 1 wherein:

the video signals are OC-12c optical carrier signals.

8. The communication system of claim 7 wherein:

the OC-12c optical carrier signals are configured for unidirectional communication from the information provider to the central office.

9. The communication system of claim 1 wherein:

the data signals are OC-3c optical carrier signals.

10. The communication system of claim 9 wherein:

the OC-3c optical carrier signals are configured for bidirectional communication between the information provider and the central office.

11. The communication system of claim 1 wherein:

the central office further includes a public, education, and government (PEG) video channel generator for generating a PEG video signal, wherein the ATM edge switch receives a video signal from the optical ring and then integrates the PEG video signal into the received video signal.

12. The communication system of claim 11 wherein:

the central office further includes an optical splitter, wherein the ATM edge switch provides the integrated video signal to the optical splitter, wherein the optical splitter splits the video signal received from the ATM edge switch into multiple video signals and then provides a respective video signal to each one of the plurality of host digital terminals.

13. The communication system of claim 12 wherein:

the optical splitter is operable with the second one of the multiplexers for connecting the central office to the optical ring, wherein the optical splitter splits a second video signal received from the optical ring into a second set of multiple video signals and then provides a respective video signal from the second set of multiple video signals to each one of the plurality of host digital terminals.

14. The communication system of claim 1 further comprising:

a second central office connected to the optical ring via a third one of the multiplexers, the second central office includes an ATM edge switch operable with the third one of the multiplexers for receiving video and data signals from the information provider via the optical ring and for transmitting data signals to the information provider via the optical ring.

15. The communication system of claim 14 further comprising:

a third central office connected with the second central office via corresponding multiplexers of an internal optical ring, the third central office includes an ATM edge switch operable with the corresponding multiplexers for receiving video and data signals from the second central office via the internal optical ring and for transmitting data signals to the second central office via the internal optical ring.

16. The communication system of claim 15 wherein:

the internal optical ring includes an OC-48 optical carrier interconnecting the corresponding multiplexers.

17. An asynchronous transfer mode (ATM) based very-high-bit-rate subscriber line (VDSL) communication system, the ATM based VDSL communication system comprising:

an optical ring having a plurality of multiplexers;

an information provider connected to the optical ring via a first one of the multiplexers, the information provider including an ATM core switch operable with the first one of the multiplexers for transmitting data and video signals on to the optical ring and for receiving data signals from the optical ring; and a central office connected to the optical ring via a second one of the multiplexers, the central office includes an ATM edge switch operable with the second one of the multiplexers for receiving video and data signals from the information provider via the optical ring and for transmitting data signals to the information provider via the optical ring, wherein the central office includes a plurality of host digital terminals connected to the ATM edge switch for receiving video and data signals from the information provider and for transmitting data signals to the information provider, wherein at least one of the host digital terminals is connected to a plurality of end users, wherein the ATM edge switch demultiplexes a data signal received from the optical ring via the second one of the multiplexers into multiple data signals and then provides a respective data signal to each one of the plurality of host digital terminals, wherein the central office further includes an optical splitter, the optical splitter being operable with the second one of the multiplexers for connecting the central office to the optical ring, wherein the optical splitter splits a video signal received from the optical ring into multiple video signals and then provides a respective video signal to each one of the plurality of host digital terminals.

\* \* \* \* \*